United States Patent [19]

Bongort et al.

[11] 4,064,755

[45] Dec. 27, 1977

[54] LIQUID LEVEL SENSOR

[75] Inventors: Edgar A. Bongort, Southfield; William T. Cruickshank, Pontiac, both of Mich.

[73] Assignee: B/W Controls, Inc., Birmingham, Mich.

[21] Appl. No.: 758,568

[22] Filed: Jan. 12, 1977

Related U.S. Application Data

[62] Division of Ser. No. 627,518, Oct. 31, 1975.

[51] Int. Cl.² ............... G01F 23/12; H01H 36/00
[52] U.S. Cl. ....................... 73/313; 73/DIG. 5; 200/84 C
[58] Field of Search ................ 73/313, DIG. 5; 200/84 C; 335/153, 206, 207

[56] References Cited

U.S. PATENT DOCUMENTS

| 1,723,172 | 8/1929 | Huggins ........................... 73/313 |
| 3,198,902 | 8/1965 | Deschautreaux, Jr. ......... 335/153 X |
| 3,678,750 | 7/1972 | DiNoia et al. .................... 73/313 |

Primary Examiner—Richard C. Queisser
Assistant Examiner—John S. Appleman
Attorney, Agent, or Firm—Burton, Parker & Schramm

[57] ABSTRACT

A liquid level sensor having a vertical guide tube with one or more magnetically operated switches therein at vertically spaced locations and a free float thereon which rises and falls with the liquid level and as it passes each switch magnetically latches it in one condition until the float returns in the opposite direction and unlatches it. The switches may be normally open, normally closed, or any combination, so that movement of the float past the switches may provide any desired circuit sequence.

7 Claims, 29 Drawing Figures

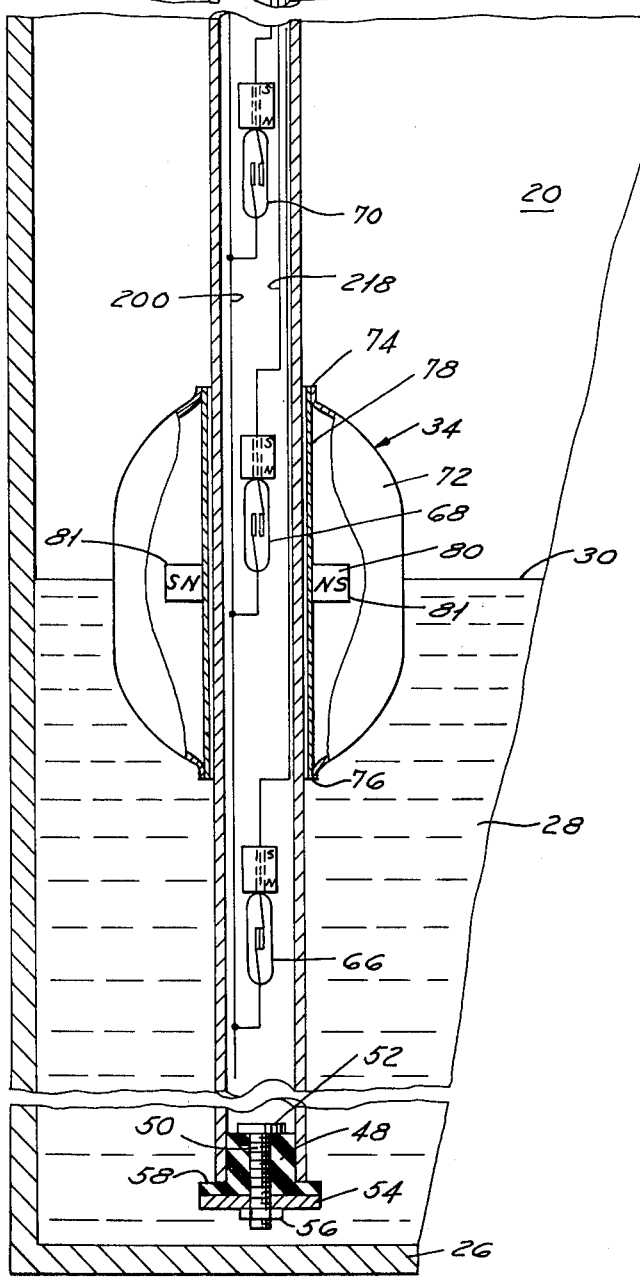
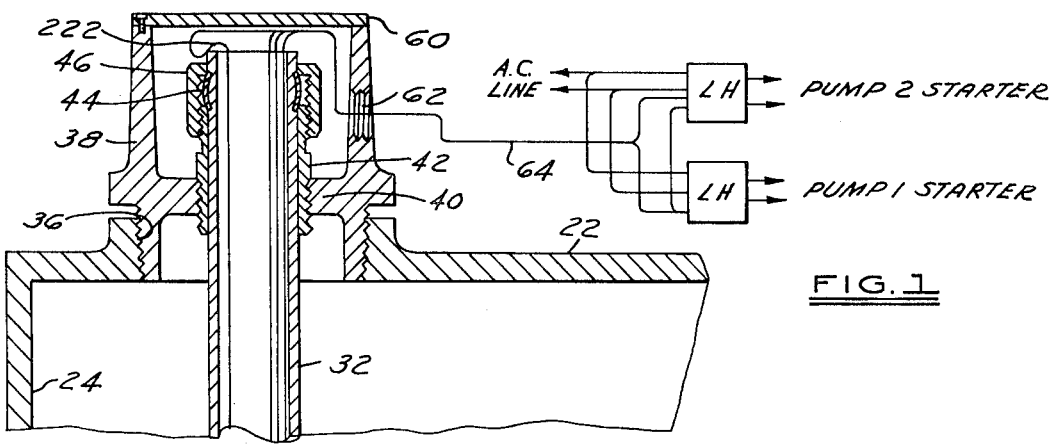
FIG. 1
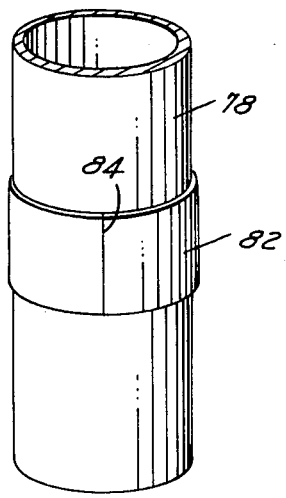
FIG. 11
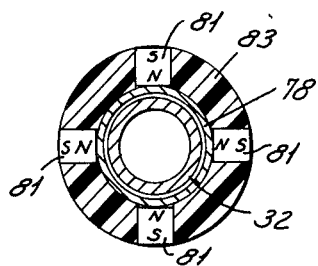
FIG. 12

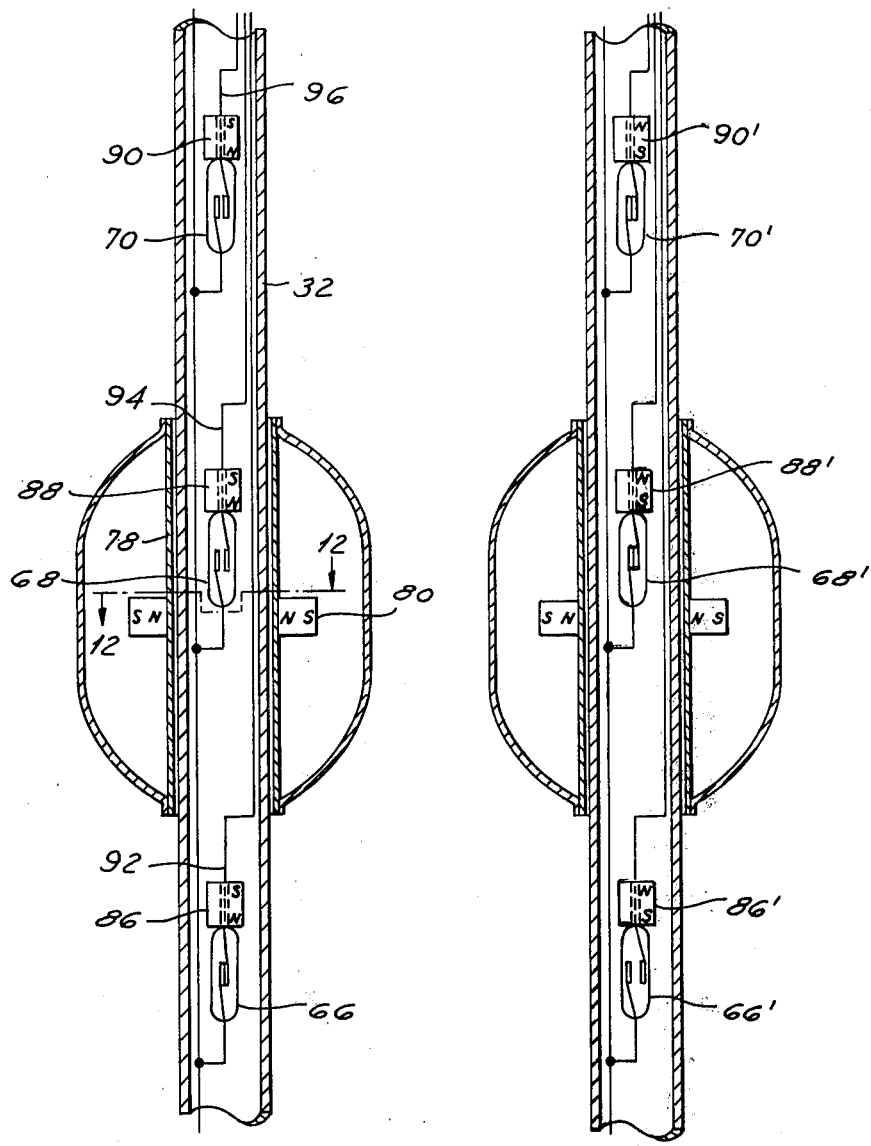

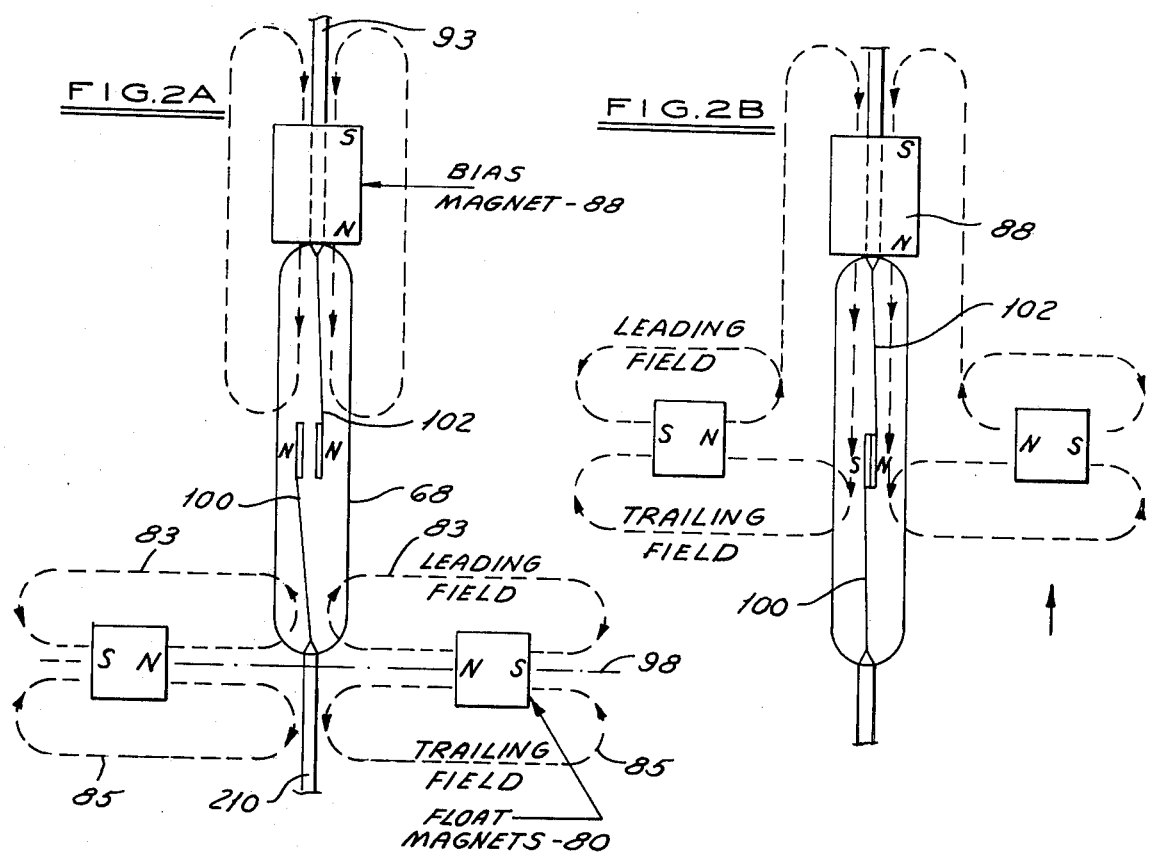
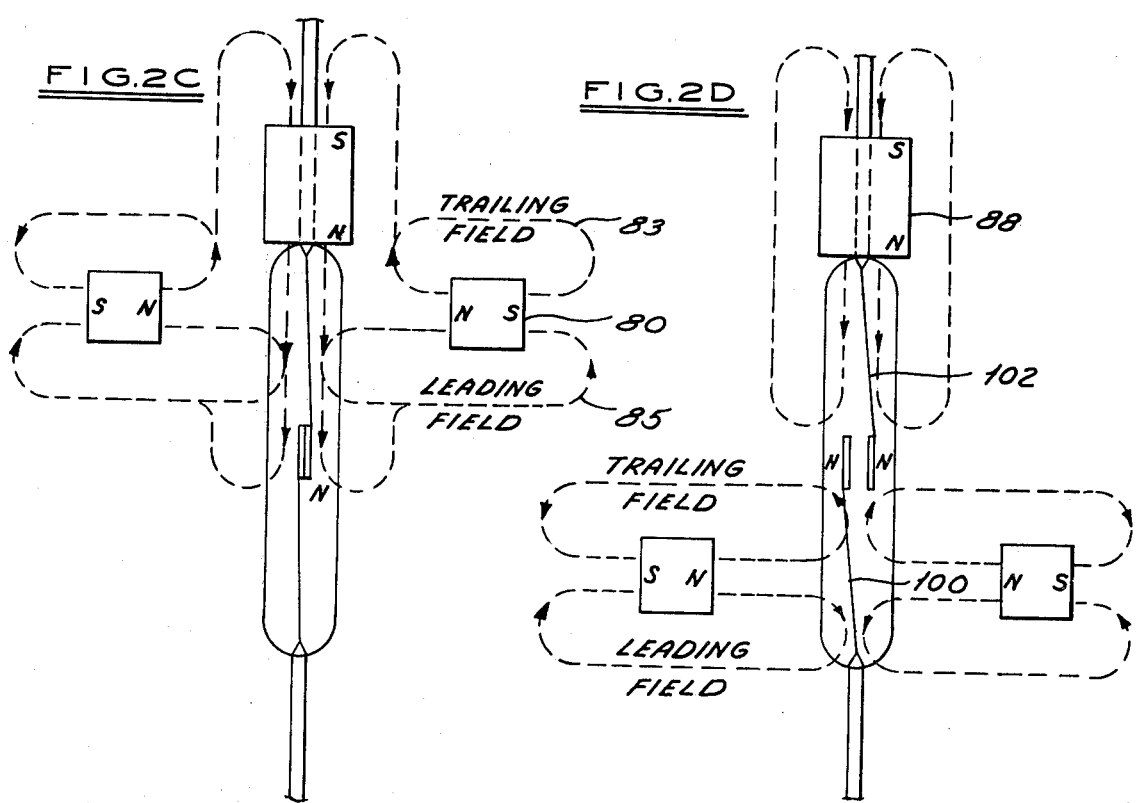

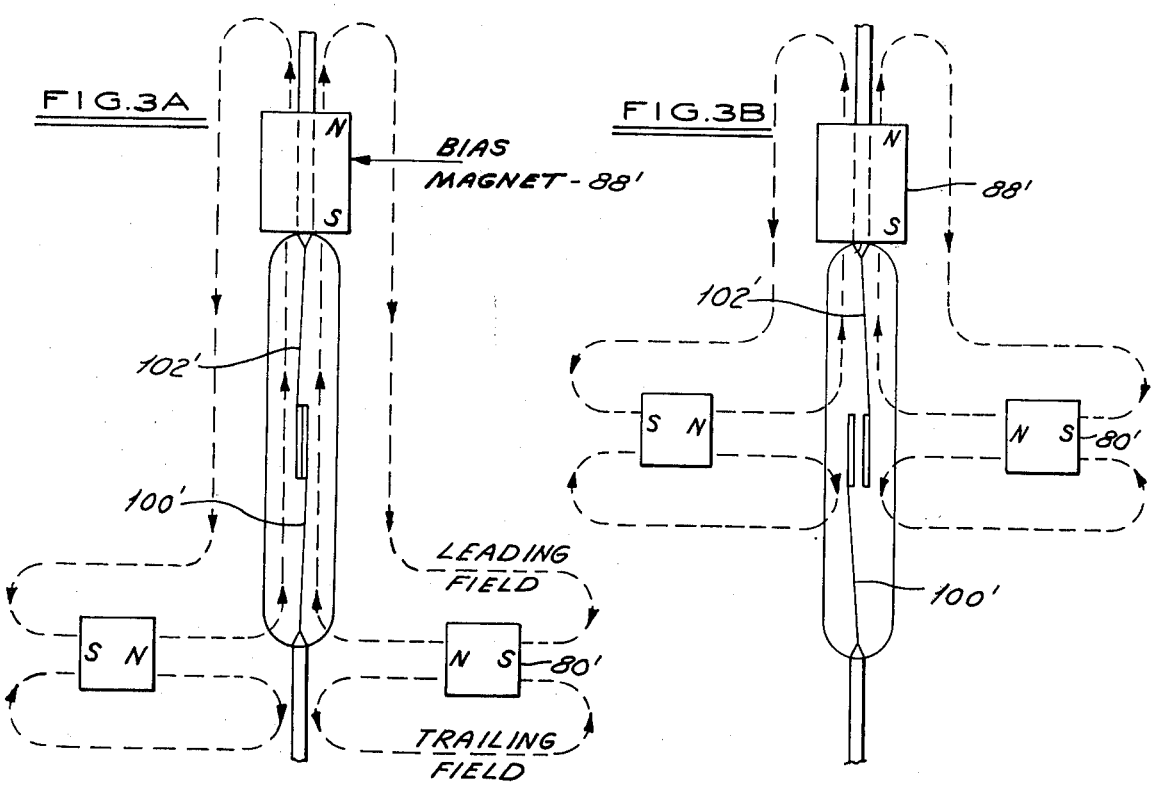
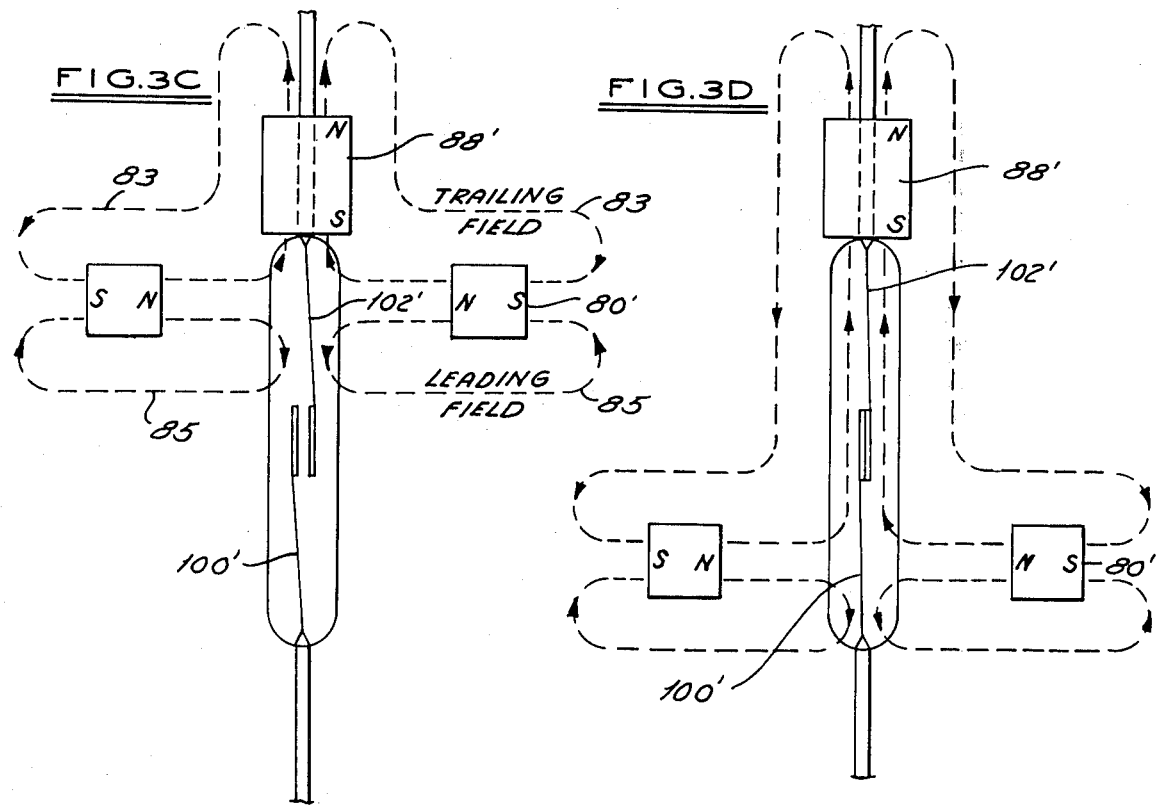

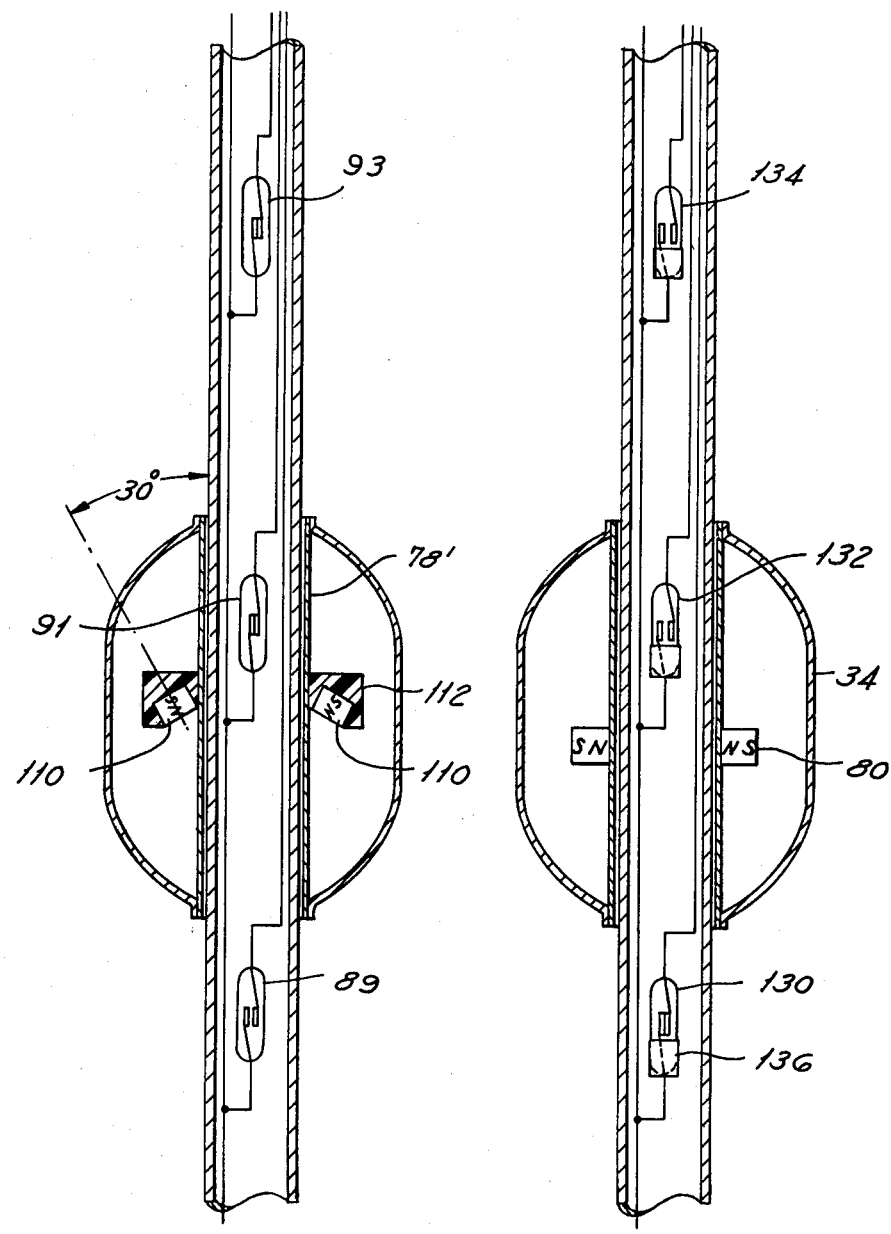

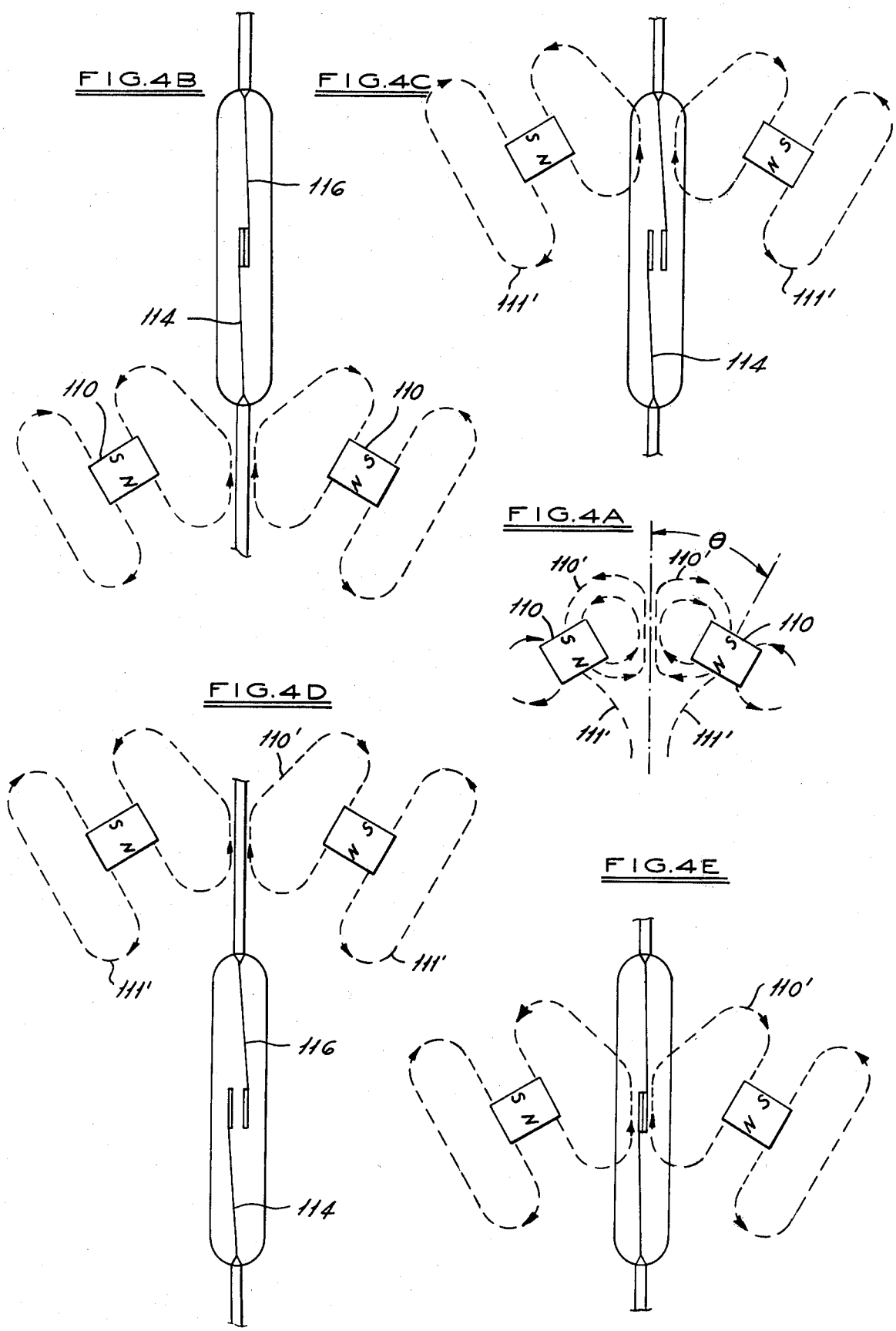

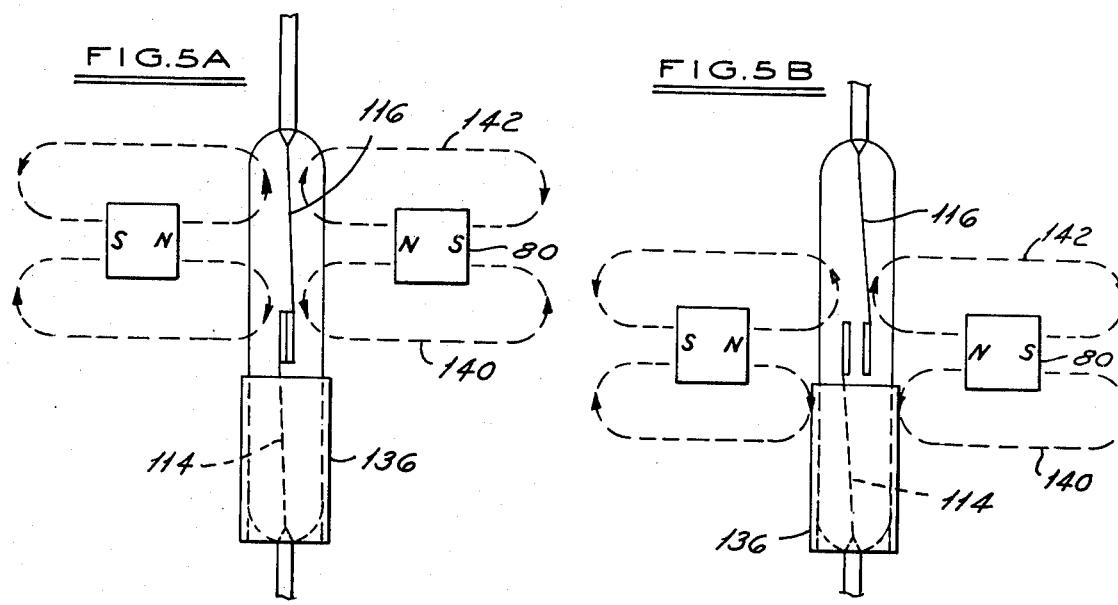
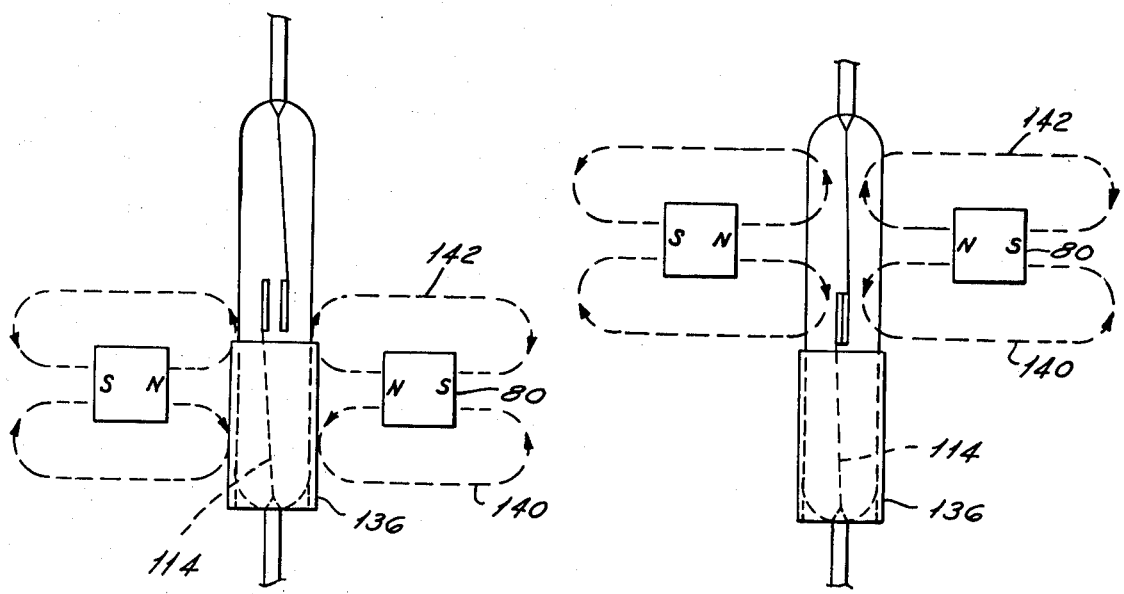

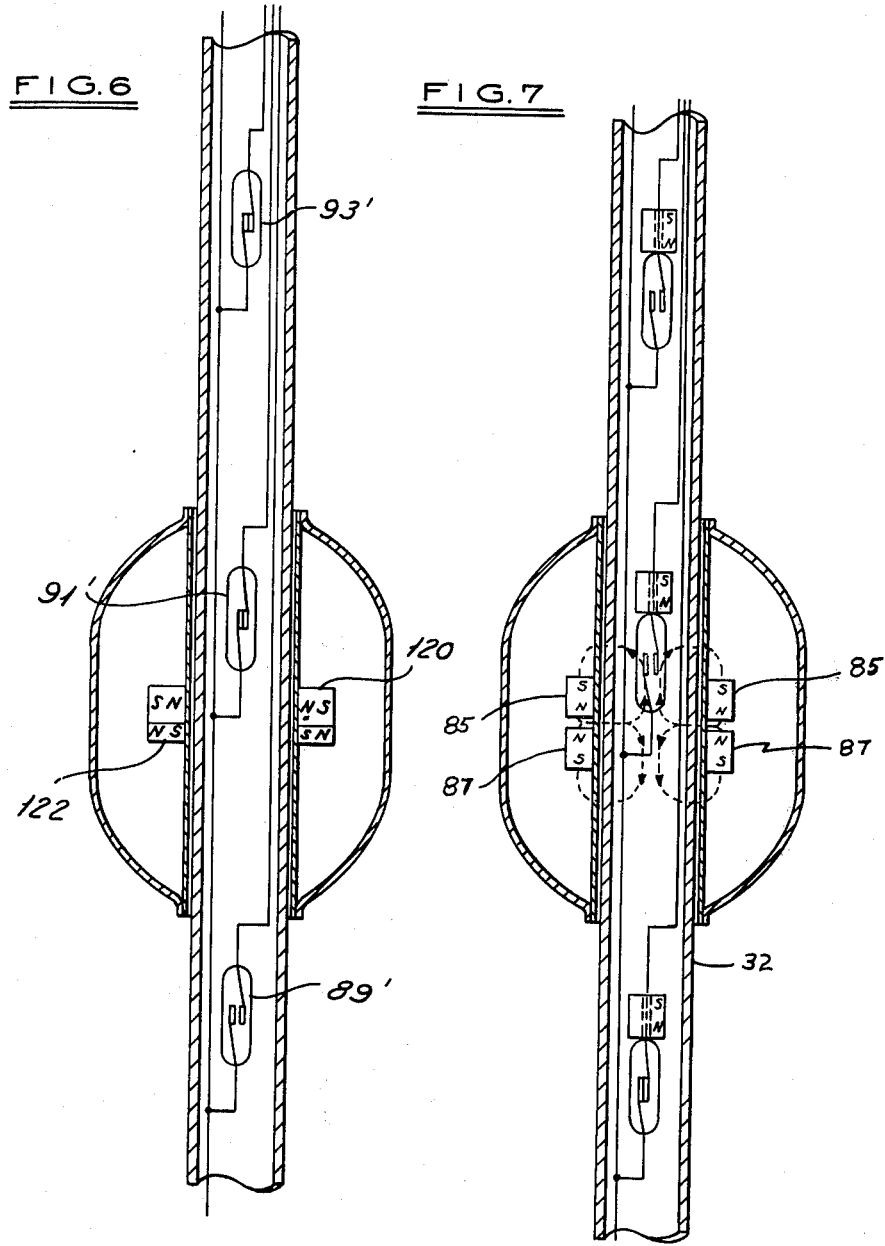

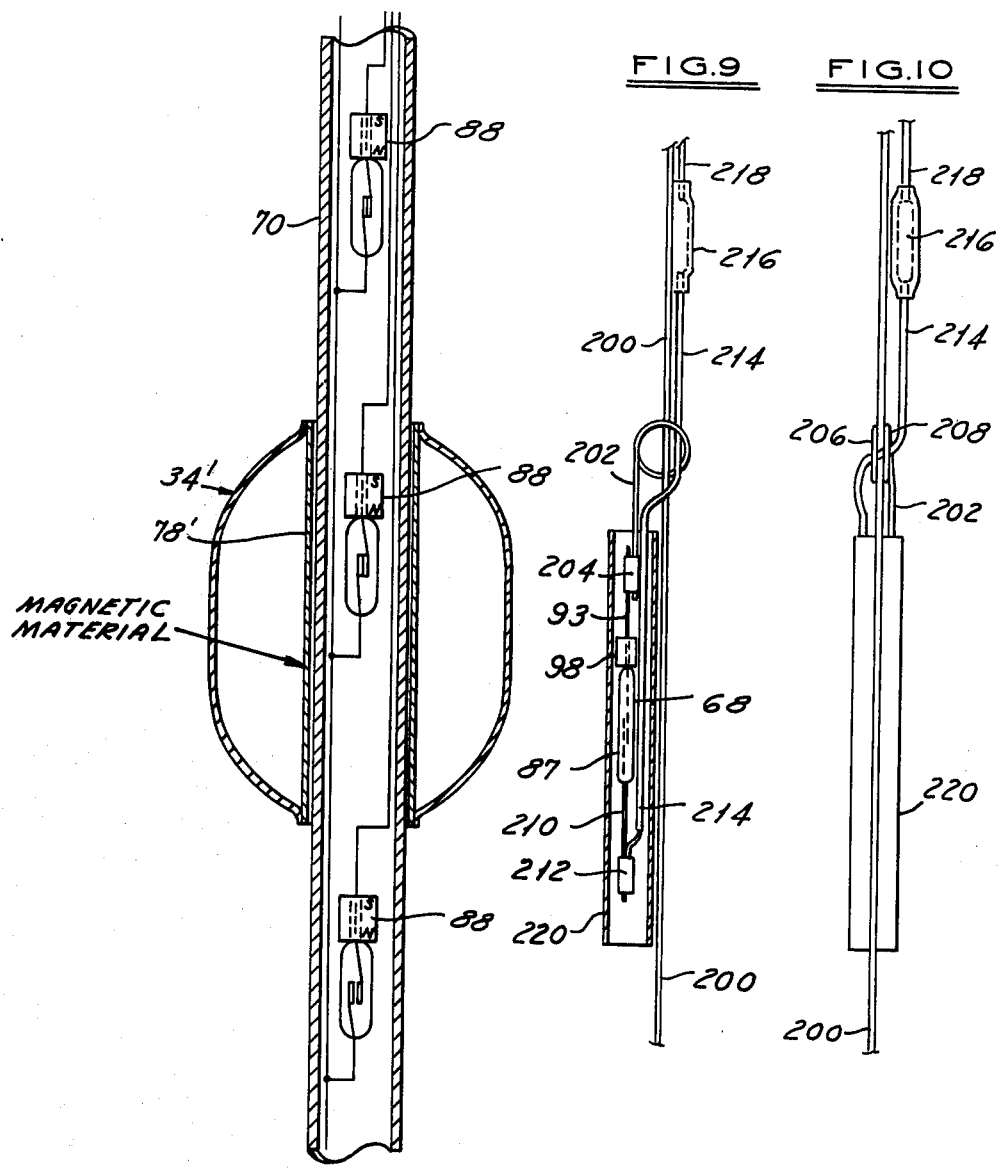

LIQUID LEVEL SENSOR

This is a division, of application Ser. No. 627,518, filed Oct. 31, 1975.

FIELD OF INVENTION

This invention relates to position sensing apparatus, in particular liquid level sensing devices of the type having a vertical guide tube containing magnetic proximity switches and a free float slidable on the tube and buoyant in the liquid to rise and fall with its level, and in passing the switches actuating them.

BACKGROUND OF THE INVENTION

It is known in the art to provide a liquid level sensor comprising a non-magnetic guide tube vertically arranged in the liquid whose level is to be sensed, with a plurality of reed switches disposed spaced apart in the tube to be actuated by a magnet carried by a float guided on the tube and rising and falling with the liquid level. The reed switches are connected in electric circuits to signal the liquid level, and may serve to cause energization of pumps, alarms, indicators and the like. The following United States patents are representative of such teaching: U.S. Pat. Nos. 3,200,645; 3,788,340; 3,646,293; 3,678,750; 3,685,357.

A problem common to each of these is that while the reed switch is closed as the float magnet passes, as for example during a rise of the float, it then opens as soon as the float magnet passes above the switch. Consequently, the only time a circuit is completed through the reed switch is when the float magnet field is sweeping it, and in order to be useful the reed switch must therefor be electrically connected to a system which is undisturbed by the switch opening as the float continues to rise. Such a system may utilize a latching relay as in U.S. Pat. No. 3,685,357 which will maintain a circuit energized even though the reed switch opens. Redundancy problems are raised by such arrangements to insure that when the reed switch opens it is not because the float has reversed direction but is actually still rising. In addition, should a float be rising and before reaching a reed switch there be an electric power failure during the time the float passes the switch, the circuit will not indicate the increased liquid level when the power returns.

To avoid redundancy problems, power failure problems, latching relays and the like, efforts have been directed to devising means for maintaining the reed switch closed when the float magnet reaches it and despite the liquid level continuing to rise. One commercially available solution, and another shown in U.S. Pat. No. 3,826,139, involves the use of a guide tube having a plurality of floats, one for each reed switch, and stops on the guide tube which limit the rise of each float so that its ascent is arrested when its magnet has closed the reed switch. The float then remains in this position as the liquid continues to rise thus holding the reed switch closed. The switch is opened when the liquid level falls sufficiently to allow the float to drop away from the stop and carry its magnet sufficiently below the reed switch so it can open. In addition to the necessity of using a number of floats, which increases the cost of the system, the only way the sensing levels can be changed is by physically shifting the float stops on the guide tube and this entails gaining physical access to the outside of the guide tube which is sometimes difficult or inconvenient.

Another solution is proposed by U.S. Pat. No. 3,437,771 where a two-part float is shown, one part carrying a magnet is intended to lock onto a bias magnet at the switch and open the switch and remain at the switch until the other float part drops sufficiently to carry the inner float down away from the switch and allow the switch to re-close. This teaching also uses a stop to limit rise of the float, and would require multiple floats and stops if more than two switches (levels) were involved. In addition, the switch is normally closed by the bias magnet and is opened by the float magnet, and the teaching would appear to be limited to this mode of operation.

SUMMARY OF THE INVENTION

We have overcome these objections to the prior art and in addition have obtained other positive advantages by providing a liquid level sensor in which, when the float passes a switch in the guide tube, the switch is magnetically actuated to a different contact condition which is then maintained despite ongoing movement of the float completely past the switch, until the float returns and passes the switch in the opposite direction whereupon it will magnetically actuate the switch to return this contacts to their initial condition. As a result of this it is possible to provide a guide tube with a plurality of switches arranged at various levels, and a single free float which rises and falls with the liquid level, and which will successively actuate and latch each switch it passes as it rises, for example, and then successively unlatch each switch it passes as it falls. Thus, the need for latching relays in the switch circuits is eliminated. Actuation and latching of the switches is accomplished utilizing permanent magnets and is only dependent upon movement of the float in a given direction past a switch. Accordingly, temporary power failures during movement of the float past a switch will not affect the logic of our system, and it will not lose step or phase with the liquid level.

Our sensor may also be constructed to provide switches of different operating modes at various levels within the same guide tube, viz., one switch may be normally open and another normally closed and as the float travels in one direction along the tube each will have its contacts shifted to the opposite condition.

The switches may be supported in the guide tube for re-positioning from an end of the tube, and in view of the freedom of the float to traverse the tube and latch each switch as it passes, such re-positioning of the switches allows for a simple adjustment of the liquid level sensing height without the necessity of gaining access to the float. In other words it is not necessary to re-position stops on the outside of the guide tube to limit movement of the float.

In carrying out the invention, magnetic proximity switches such as of the reed type are suspended in the guide tube for actuation and response to the sweep of a magnetic field as the float rises and falls with the liquid level past the switches. Unlike the prior art liquid level sensors utilizing reed switches, the reed switches of this invention are latched open or closed, as desired. We have shown various ways of accomplishing this; each requiring a certain combination and arrangement of switch and float structures.

According to one approach, a conventional reed switch having normally open contacts, is provided with a small bias magnet of a strength insufficient alone to close the contacts, but once closed sufficient to hold them closed. Magnet means carried by the float are so arranged as to provide leading and trailing magnetic fields of opposite direction viz., leading and trailing in relation to float movement along the guide tube, and "opposite direction" having reference to the direction of the magnetic lines of flux. When the direction of the trailing field of the float magnet sweeping the reed switch augments or compliments the polarity of the bias magnet, the reed switch is thereupon closed and remains closed under the influence of the bias magnet though the float moves on away. The switch will remain closed until the float magnet again approaches from the opposite direction and the direction of its trailing field opposes the polarity of the bias magnet, whereupon the switch will open and remain open though the float continues on past the switch and moves away. We have shown two approaches to obtaining leading and trailing fields of opposite direction. According to one approach the float magnet means is arranged to have one pole facing radially inwardly toward the guide tube and the opposite pole facing radially outwardly. According to another approach the float magnet means comprises a pair of magnet arrays with each array comprising a plurality of magnets arranged circumaxially around the guide tube with the axes of the magnets extending along the guide tube and with the arrays arranged longitudinally along the float in adjacent relation and with common magnet poles in confronting relation.

In another embodiment of the invention reed switches having reeds of a material capable of having a high residual magnetism (hereinafter referred to as "self-latching reed switches") are used in the guide tube. Float magnet means are provided which create leading and trailing fields of opposite directions and different strengths which sweep the guide tube and switches as the float rises and falls. When the stronger field is the trailing field as the float passes over a switch it will close it and the residual magnetism induced in the switch will hold it closed. When the float movement reverses and the trailing field is now the weaker field and of opposite direction, when such field sweeps the switch the contacts will open and remain open. Two approaches are shown to obtain magnetic fields of opposite direction and different strengths.

Also shown is an arrangement utilizing a self-latching reed switch wherein the float magnet is similar to that first described, viz., creates leading and trailing fields of equal but opposite direction.

A novel arrangement for suspending and encapsulating the reed switch assemblies is also disclosed which permits ready adjustment of the liquid level sensing points.

A number of advantages are obtainable from a liquid level sensor of the kind herein disclosed namely:
1. The sensor utilizes only one float to operate any number of switches instead of one float for each switch.
2. The sensor uses only one float stop and such is located at the bottom end of the tube.
3. Because the switch action is not dependent upon float stop locations, operating levels are easily adjusted by merely moving the switch locations up or down in the guide tube as desired.
4. The vertical distance between switches is not restricted because one float is used to operate all switches.
5. The switches can be made all normally open, all normally closed or any desired combination of normally open and normally closed.
6. The sensor can be used in any liquid, conductive or non-conductive.
7. We have found that the guide tube may be as small as ½ inch OD or as large as 2 inches OD and the float can be as small as 2 inches OD or as large as 14 inches OD and guide tubes and floats of both greater or smaller dimensions are feasible. Small floats are more suitable for clean low viscosity liquids and large floats for use with high viscosity liquids or heavy sludges.
8. The sensor is suitable for pressurized applications as well as non-pressurized environments.

BRIEF DESCRIPTION OF THE DRAWINGS

FIG. 1 is a fragmentary side elevation, in cross section, through a tank or other vessel showing a liquid sensor embodying the invention;

FIG. 2 is a fragmentary cross-sectional view of the guide tube and float of FIG. 1 showing the parts in greater detail;

FIGS. 2A, 2B, 2C and 2D schematically illustrate the magnetic fields and their co-action and effect on a reed switch of FIG. 2 during a rise and a fall of the float past the switch;

FIG. 3 is similar to FIG. 2 but wherein the bias magnets are reversed to give the opposite switch action during the same travel of the float;

FIGS. 3A, 3B, 3C and 3D are similar to FIGS. 2A-2D except they illustrate the action on a reed switch of FIG. 3;

FIG. 4 shows a modified form of magnetic proximity switch and float magnet means;

FIGS. 4A, 4B, 4C, 4D and 4E schematically show the force fields of the float magnet and the effect on the reed switch of FIG. 4 during a rise and a fall of the float past the switch;

FIG. 5 is a fragmentary cross-sectional view through another form of proximity switch in the guide tube with a float similar to FIGS. 1-3;

FIGS. 5A, 5B, 5C and 5D illustrate schematically the force fields of the float magnet and their effect on a reed switch of FIG. 5 as the float rises and falls past the switch;

FIG. 6 is a fragmentary cross-sectional view through a guide tube and float showing a further modification of the invention;

FIG. 7 is a fragmentary cross-sectional view through a guide tube and float embodying a further modification of the invention;

FIG. 8 is a cross-sectional view through a guide tube and float embodying another form of the invention;

FIGS. 9 and 10 are respectively side and front views showing a preferred arrangement for connecting, protecting and suspending a proximity switch for insertion in the guide tube;

FIG. 11 shows an embodiment of the float magnet means, portions of the float being removed for clarity, and FIG. 12 is a cross-sectional view taken on the line 12—12 of FIG. 2.

BRIEF DESCRIPTION OF PREFERRED EMBODIMENTS

In FIG. 1 an installation for a liquid level sensor has been depicted as comprising a tank or other vessel 20 having top, side and bottom walls 22, 24 and 26 with a liquid 28 therein whose level 30 is to be sensed. A guide tube 32 is shown arranged vertically within the tank 20 with a free float 34 mounted on the tube for guided movement therealong as the liquid level 30 rises and falls. The buoyancy of the float 34 is such that it will be supported by the liquid with approximately 50 percent of the float submerged and its "water line" or liquid line at the liquid surface 30 encircling the float substantially midway between its upper and lower ends.

While the guide tube may be supported in the tank in various ways, in the embodiment shown in FIG. 1, which is intended to be illustrative only, the top wall 22 of the tank contains a pipe threaded opening 36 into which is screw threaded a junction box 38 provided with a transverse web 40 within which is threadedly sealed a tube fitting 42 telescopingly receiving the guide tube 32 in a slip fit. The upper end of the tube fitting 42 is provided with an internal chamfer and a ferrule 44 has a lower end received in the chamfer and the other end trapped within the lip of a nut 46 threaded on the upper end of the tube fitting, such that as the nut is tightened down the ferrule is squeezed against the tube to grip the guide tube and hold it securely in the tube fitting and seal it therein.

The guide tube 32 should be formed of a non-magnetic material. Austenitic stainless steel would often be quite suitable, but the material of the guide tube is dictated by the liquid within which it will be disposed. The diameter of the guide tube will also be dependent upon the environment for the sensor, the length of the tube sensor, etc. Except as hereinafter mentioned, the guide tube may be of any suitable diameter such as from ½ inch to 2 inches OD. For applications having a considerable vertical extent, or turbulent liquid movement, larger diameters would be preferred over smaller diameters.

The inside of the guide tube is sealed from the liquid 28. One arrangement for accomplishing this purpose is shown in FIG. 1. The lower end of the tube is sealed by the use of a neoprene or other suitable elastomeric plug 48 having a stem portion telescoped inside the lower end of the tube and a flange portion overlying and abutting the lower edge of the tube. A bolt or the like 50 having a head 52 overlying the inner end of the plug and a shank extending downwardly through and beyond the lower end of the plug and through a disc or the like 54 and threaded into a nut 56, is utilized to squeeze the plug axially and thereby expand it radially to tightly grip the inner wall surface of the guide tube and the surface of the bolt to seal thereagainst and lock the plug in the tube. The portion 58 of the flange of the plug which extends beyond the outside diameter of the guide tube serves as a stop surface for supporting the lower edge of the float 34 when the float drops to the lower end of the tube.

The junction box 38 may be closed at the top by a suitable cover 60 and the circuit wires from the switches supported in the guide tube may be led out of the junction box through a side opening aperture 62 and thence to the devices to be actuated which may comprise visual or audio alarms, or relays suitable for operation of motor starters or solenoid valves. In FIG. 1 the various circuit lines from the proximity switches are shown as being gathered into a cable 64 leading to two pump control relays which control pump starters namely, pump 1 and pump 2 motor starters as shown on the drawing. Pumps (not shown) may be connected to the vessel or tank 20 containing its liquid 28 and their function may be to pump liquid out of the tank, or into the tank, as a result of the liquid level 30 rising or falling. Three proximity switches 66, 68 and 70 are shown suspended in the guide tube. These switches are connected typically such that when the contacts of all switches are open, the pumps are inoperative.

In the FIG. 1 embodiment as a switch is closed, a signal is energized or a pump motor starter is energized to start the pump motor, perhaps to pump liquid out of the tank. If, for example, liquid can enter the tank 20 and the function of the sensor is to prevent it from exceeding the height of switch 70, when the float reaches switch 68 such will close the contacts of switch 68 and start pump number 1. If the liquid continues to rise and the float reaches switch 70, it closes the contacts thereof and starts motor number 2. According to the invention, switches 66 and 68 remain closed as the rising float passes above them. Assuming that with both pumps in operation the liquid level within the tank is being reduced, and as the float descends and reaches each of the switches 70, 68 and 66 the contacts thereof will be opened. During descent of the float and opening of switches 70 and 68 the pumps may continue operative through the provision of the relays LH until switch 66 is opened whereupon both pumps will be stopped. In any event, it will be understood that the proximity switches 66, 68 and 70 are normally open switches (they are closed as the float rises) and as the float reaches each switch it closes its normally open contacts and latches them closed as the float continues to rise beyond the switch. Such contacts remain latched closed until the float descends reaching and passing each switch whereupon the contacts are unlatched and are opened and remain open until the float again re-ascends to effect a closing thereof.

The float 34 may be formed of any suitable non-magnetic material. Any suitable plastic or austenitic stainless steel may be used. The float should be hermetically sealed. If desired, it may be filled with a closed cell foam, so that in the event the float is punctured it will nevertheless retain its buoyancy. In the preferred form the float comprises a structure symmetrical along both longitudinal and transverse axes and is generally egg shaped having a greater axial than transverse dimension. The float has an outer wall 72 secured to and sealed at upper and lower edges 74 and 76 to a central float tube 78. The float tube 78 is sized to be a free sliding fit about the guide tube. Inside the float and secured to the float tube 78 substantially midway of its length viz., radially opposite its liquid line, is float magnet means 80. Such float magnet means may comprise, as shown in FIGS. 2 and 12, a plurality of small bar magnets 81 arranged around and extending radially with respect to the guide tube axis and float tube axis, which are essentially coincident. The axes of such magnets also lie essentially perpendicular to the axes of the float tube and guide tube or in a plane 98 disposed perpendicular thereto as shown in FIGS. 2A–2D. It will be observed from FIGS. 2 and 12 that the magnet means 80 has north poles facing radially inwardly and south poles facing radially outwardly.

The magnet means 80 may take various forms. For example, the magnet means may comprise a plurality of small bar magnets 81, as previously mentioned, arranged in radial array with north poles facing radially inwardly and south poles outwardly. Such small bar magnets 81 may be potted in a suitable potting material 83 such as an epoxy resin, melamine resin, urethanes, etc. shaped in the form of an annulus and secured to the tube 78 in any suitable fashion. Alternatively, and preferably, the magnet means 80 may comprise a strip of rubber-bonded barium ferrite composite material sold under the trademark PLASTIFORM by 3M Company. This is a flexible magnet containing magnetic particles whose poles are arranged in uniform directions to create a north pole on one side of the strip and a south pole on the other side of the strip. A length of such strip is shown at 82 in FIG. 11 wrapped around the float tube 78 with the ends cut to match as at 84. A suitable adhesive may be utilized to adhere the strip to the float tube. If desired, a suitable non-magnetic contractive band (not shown) may be affixed around the strip 82 to grip it to the float tube and insure against displacement.

Thus, with the embodiment shown in FIGS. 1 and 2 the north poles of the float magnet means face radially inwardly while the south poles face radially outwardly. In addition, it will be noted that by positioning the magnet means 80 midway of the vertical length of the float, and with the float buoyancy such that the liquid level 30 is substantially midway of the vertical dimension of the float, the magnet means and liquid level will be substantially horizontally coincident. Accordingly, the position of the magnet means 80 corresponds quite accurately with the liquid level.

In the embodiment shown in FIGS. 1 and 2 the proximity switches 66, 68 and 70 each comprises a conventional reed switch having a glass envelope 87 (see FIG. 9) within which are positioned a pair of flexible magnetic reeds or contacts of low magnetic permanence with one reed extending from each end of the envelope and with the reeds having overlapping contact faces substantially midway of the length of the envelope. These reed switches are readily available from a number of sources. They are arranged in the guide tube to have their axes extend longitudinally thereof. When a magnetic field of sufficient strength is impressed across the contacts, it will cause them to close and when the magnetic field is removed the contacts will open. The contacts are physically spring biased by virtue of their construction so that they are normally open and are closed when exposed to a magnetic field of sufficient strength and proper direction. Accordingly, the reed switches for use in the embodiment of FIGS. 1 and 2 will close when subjected to a magnetic field of sufficient strength and will open upon removal of such field. Accordingly, they do not by themselves have any magnetic latching capability.

We have associated with each of these reed switches as shown in FIGS. 1 and 2 small bias or latching magnets 86, 88 and 90, each of which has its poles or magnetic axis arranged parallel to the axis of the reed switch, namely, vertically. These three bias magnets may be formed of any suitable magnet material but preferably are formed utilizing a material similar to the above mentioned magnetic strip but of a greater thickness, such as ¼ inch. A small piece of such material may be cut out and a hole pierced therethrough and the small piece then slipped over the upwardly projecting terminal 92 with the terminal extending through the hole. Similar small pieces of such magnet material may be associated with the upwardly extending terminal 94 and 96 at the upper end of each of the switches 68 and 70 respectively. Each bias magnet is sized and positioned so that its field strength is insufficient alone to close the normally open contacts of its associated reed switch but is of sufficient strength to hold the contacts closed once they have been closed.

In FIGS. 1, 2 and 3 the bias magnets are shown in a position that is considered to be most desirable. However, the bias magnets may take on different arrangements to achieve the same results. For example, the bias magnet may be placed at the end of the switch with its pole pointed radially upward, or in the middle of the switch with poles pointed up and down, parallel to the axis of the switch.

The effect of the bias magnets and the float magnet on the operation of the reed switches is best understood by reference to FIGS. 2A, 2B, 2C and 2D. In these FIGS. the magnetic fields of the magnets are schematically represented by dashed lines. In FIG. 2A the float is assumed to be rising and its magnet means 80 creates a leading field 83 extending upwardly and a trailing field 85 extending downwardly and in the area where such fields sweep the reed switch 68 they are of opposite direction. The polarity of the leading field of FIG. 2A results in the reed or contact 100 having a north polarity at its contact face. At the same time reed or contact 102 will have a north polarity at its contact face as a result of the polarity of the bias magnet 88. With like polarities at the contact faces of reeds 100 and 102 the contacts are repelled and remain open as the float magnet 80 approaches the reed switch.

However, when the float magnet is radially opposite the contact faces of reeds 100 and 102, as shown in FIG. 2B, the contacts are closed. This results from the trailing field 85 of the float magnet having a direction complimenting or augmenting the polarity of the bias magnet creating a north-south polarity across the contacts to close them. As the float rises above and carries its magnet means 80 above the FIG. 2B position, the magnetic field of the bias magnet will continue to hold the reed switch contacts in the closed position shown in FIG. 2B and also as shown in FIG. 2C.

In FIG. 2C the float is descending such that the leading field is now field 85 below the float magnet and the trailing field 83 is above it. As the leading field reaches the reed switch it will at first augment or compliment the bias magnet polarity across the reed switch maintaining the contacts closed, and such is shown in FIG. 2C. However, when the float has descended slightly more, its trailing field, which is upwardly directed will produce a north polarity at the contact of reed 100 which will thereupon be repelled from the north polarity of reed 102 as imposed by the bias magnet 88 and the switch will open and remain open as the float descends below the switch.

Consequently it can be seen from FIGS. 2A, 2B, 2C and 2D that by providing leading and trailing fields in the guide tube of opposite direction above and below the transverse axis of the float and by providing a bias magnet in association with the reed switch of sufficient strength to hold the contacts closed but of insufficient strength to close them and wherein the strength of the float magnet and the bias magnet are sufficient to close the contacts, the proximity switches in the guide tube can be made to function as latching reed switches.

It will also be observed that means are thus provided which will close each switch when the float passes by it moving upwardly and open each switch when the float passes by it moving downwardly. Means are also provided for holding the switch closed independently of the distance the float moves above the switch. Further it will be noted that like poles of the bias magnets of FIGS. 1-3 point in the same direction longitudinally of the guide tube and the downwardly facing poles of the bias magnets correspond in polarity to radially inwardly facing poles of the float magnet. This produces switches which are normally open when the float is at the bottom of the guide tube and close as the float ascends.

In FIG. 3 there is shown a modification of the embodiment of FIGS. 1 and 2 wherein the polarity of the bias magnets has been reversed from that shown in FIGS. 1 and 2. Corresponding reference numerals have been used in FIG. 3 to indicate like parts. The bias magnets 86', 88' and 90', have their north poles facing upwardly and their south poles downwardly. The effect of this is to change each of the proximity switches from normally open to normally closed. Thus switch 66' which is normally closed, is opened and remains open as the float reaches and passes above it. Switch 68' is shown in its normally closed position just prior to being opened and switch 70' is shown in its normally closed condition. In other words the switch remains closed as long as the float magnet is below the switch and the switch will open and remain open as long as the float magnet is above the switch. Switch operation may also be reversed by reversing the poles of the float magnet. In other words, the switches of FIG. 2 may be made normally closed by providing the float magnet with the south poles pointing radially inwardly and the north poles outwardly.

A substantial advantage arising from the constructions shown in FIGS. 1-3 is that they permit the reed switches in a guide tube to be of different operating modes, viz., some of the switches may be normally open as in FIG. 2 and some of them may be normally closed as in FIG. 3; the mode of operation being obtained simply by the polarity orientation of the bias magnet associated with each switch. Another advantage of the embodiment of FIGS. 1-3 is that the float can be placed on the guide tube with either end up because the magnetic field created by the float magnets is symmetrical.

FIGS. 3A, 3B, 3C and 3D illustrate functioning of the normally closed reed switch of FIG. 3 as the float and its magnet means approaches and passes the switch; FIGS. 3A and 3B showing the float as it is rising while FIGS. 3C and 3D as it is falling. In FIG. 3A the float magnet leading field reinforces the bias magnet field and the contacts 100' 102' remain closed. As the float magnet reaches a position substantially midway of the length of the reed switch, the polarity of contact 100' will reverse so that it corresponds to the polarity of 102' and the contacts will open. Having once opened, the strength of the bias magnet field is insufficient alone to close the contacts, and they remain open as the float magnet passes above the switch. In FIG. 3C the float is shown descending and the leading field which was the trailing field as the float ascended will, as before, tend to maintain the contacts in the opened condition until the float magnet has reached a point approximately midway of the length of the reed switch, at which time the polarity of the lower contact 100' is opposite the polarity of upper contact 102 and the contacts will close with the field forces being substantially as represented in FIG. 3D.

With the construction shown in FIGS. 1 and 2 or that shown in FIG. 3 the bias magnet 88 or 88' can be located either above or below its switch. In either case switch operation is determined by the direction that the north and south poles point (up or down). Assuming that the float magnets have their north poles pointed radially inward, a bias magnet with its north pole pointed downward will cause the switch to be closed when the float is above the switch and open when the float is below the switch. If the north pole of the bias magnet is made to point upward the switch operation is reversed.

We have found that a sensor constructed as disclosed hereinabove has a fairly close sensitivity, viz., quite small vertical movements of the float will serve to close or open the switch. Thus by accurately positioning the switches in the guide tube, a sensor having considerable accuracy is attained.

FIGS. 4 and 4A–4E show a somewhat different form of reed switch and float magnet combination in order to effect a latching operation. In this arrangement each of the reed switches has contacts made of a material capable of having a high residual magnetism. Such a reed switch, referred to herein as a self-latching reed switch, has recently become commercially available on the market, one being sold under the name MEMOREED FDR-8 manufactured by Fujitsu Limited of Japan. This type reed switch can be latched closed by a strong magnetic field and unlatched and opened by a weaker magnetic field of reversed polarity. In FIG. 4 there are shown three such switches 89, 91 and 93 arranged in the guide tube with the float magnet means being arranged to provide two fields of opposite polarity and different strengths for sweeping the guide tube.

As shown in FIG. 4 the float magnet comprises a plurality of magnets 110 arranged so that the north poles point radially inwardly and their south poles radially outwardly but with the axis of the magnets arranged in a conical configuration around the float tube 78' with the angle of the conical surface with respect to the vertical axis of the float tube preferably being at about 30°. However, this angle may range from 15° to 60°. The float magnet means may be formed by a plurality of individual bar magnets potted or encapsulated in the aforesaid conical arrangement within an annulus of any suitable potting or encapsulating material 112 which is thereafter slipped over the float tube 78' and adhesively secured thereto prior to final assembly of the float. Alternatively, the bar magnets may be potted in the potting material 112 as an integral part of the float manufacture; the particular manner of fabrication being for routine skill in the art.

According to another possible construction, the magnets 110 may be formed by arranging the elastomeric magnetic tape 82 in a conical fashion rather than a cylindrical fashion as shown in FIG. 11 and securing the same to an annulus having a conical face. In either event, the magnetic field created by the conical arrangement of the float magnets should correspond to that schematically illustrated in FIG. 4A where the angle $\theta$ is equal to approximately 30° and represents the inclination of the axis of the magnets to the axis of the float tube or guide tube. It will be observed from FIG. 4A that there is a strong magnetic field 110' directed upwardly and sweeping the axis of the guide tube, such axis being indicated by the letter B and a weaker magnetic field 111' of opposite direction extending downwardly and sweeping the axis B. The stronger upwardly directed field becomes the leading field when the float is rising and the trailing field when the float is falling and is the field existing within the cone defined by the magnets 110.

In operation, assuming the float to be rising, reference to FIG. 4B shows the contacts 114 and 116 in the closed condition with the strong magnetic leading field 110' of the magnets 110 serving to maintain the contacts in the closed condition. As the float rises and carries the magnets 110 past the contacts 114 and 116, the weaker trailing field 111' will neutralize the residual magnetism in the contacts causing the contacts to spring open. The contacts will remain in this condition as the float continues to rise and will not close until it descends as shown in FIG. 4D. As the float descends, a point is reached when the float magnets are substantially radially opposite the contact faces, as in FIG. 4E, where the strong trailing field 110' causes the contacts to close and they will remain closed as the float continues to descent below the reed switch.

Reverse operation of the reed switches may be obtained by reversing the float end-for-end on the guide tub such that the stronger field now points downwardly and the weaker field points upwardly. It will also be noted that all of the reed switches in the FIG. 4 embodiment will have the same mode of operation. In other words, this embodiment does not afford the capability of having some switches normally open and other normally closed as with the embodiments of FIGS. 1–3. An advantage of the embodiment of FIG. 4 is that because bias magnets are not used in association with the reed switches, it is possible to place the reed switches closer together vertically within the guide tube and therefor obtain more control functions in a given height.

Referring now to FIG. 6, a further modification is shown which corresponds closely to the FIG. 4 embodiment in that each of the reed switches is of the self-latching type, namely, having contacts formed of a material capable of relatively high residual magnetism. As these switches correspond to those of FIG. 4 they are correspondingly numbered. The float magnet means of the FIG. 6 embodiment differs substantially from that of FIG. 4 but the effect is to create oppositely directed magnetic fields of differing strengths similar to the fields created by the conical magnet arrangement of FIG. 4. In accomplishing this, a radially extending arrangement 120 of magnets having inwardly facing north poles and outwardly facing south poles are disposed just above a radially extending array of magnets 122 having radially inwardly facing south poles and outwardly facing north poles. The magnet array 120 has larger and stronger magnets than the array 122 and consequently fields of different strengths above and below the magnet assembly are formed. An alternate but similar arrangement may utilize a washer of magnetic material such as mild steel to replace magnet array 122. Such magnet means may be formed by potting or encapsulating small bar magnets whose polarity is arranged as shown, or by utilizing the rubber-like magnetic material mentioned in connection with the FIGS. 1–3 embodiments.

It will be apparent that with a stronger magnetic field extending upwardly and a weaker magnetic field of reverse direction extending downwardly, the effect on the reed switches will be similar to that explained in connection with FIGS. 4B–4E, namely, the reed switches are normally closed and are opened and remain open as the float rises and are closed and remain closed as the float falls.

Referring now to FIG. 5, a further embodiment of the invention is shown utilizing self-latching reed switches of the kind shown in FIGS. 4 and 6 and a float of the kind shown in FIGS. 1–3. In order to provide a workable arrangement in the FIG. 5 embodiment utilizing this type of self-latching reed switch and float magnet means, each of the reed switches is provided at one end with a magnetic shield 136 of low residual magnetism as shown in FIGS. 5A through 5D. The shield is cylindrical to conform to the outside surface of the reed switch envelope and extends over approximately forty percent of the length of the envelope substantially as shown in FIGS. 5A–5D. As a result, the switch is opened and remains open when the float passes over the switch in a direction that carries the float magnet over the shielded end last.

Referring to FIGS. 5A through 5D, the magnetic shield covers the lower end of the switch. With the float magnet 80 slightly above a mid-point of the reed switch, as shown in FIG. 5A, the switch contacts are strongly influenced by the leading field 140 and are held closed. When the float descends to the level of the mid-point of the contacts, as shown in FIG. 5B, the upper reed 116 is influenced by the trailing field 142 which develops a south polarity in the upper reed contact and the leading field 140 produces a south polarity in the lower reed 114 so that the contacts repel each other to open the switch. This condition is shown in FIG. 5B.

As the float continues to descend the lower reed 114 is shielded from the trailing field 142 so that the switch remains open as in FIG. 5C though the float continues to descend substantially below or beyond the switch. The contacts will remain open until the float ascends again such that the field 140, at that time the trailing field, can influence the contacts and produce a north and south polarity across them such that they are closed as shown in FIG. 5D. To obtain reverse operation of the switch with this embodiment, the shield 136 instead of being placed at the lower end of the reed switch is placed at the top end thereof.

An advantage of the embodiment shown in FIGS. 5, 5A–5D is that the float can be placed on the guide tube with either end up and the reed switches within the guide tube may have different operating modes, i.e. some of the switches may be normally opened and the others normally closed. In addition, it is possible to place the reed switches in closer vertical proximity in view of the fact that a bias magnet is not utilized.

In FIG. 7 a further embodiment is shown. Here the float magnet means creates oppositely directed fields which extend upwardly and downwardly in the guide tube 32 to create leading and trailing fields of opposite direction, but instead of arranging magnets with common poles facing radially inwardly and the opposite poles facing radially outwardly, the poles are arranged to face parallel to the axis of the guide tube.

As shown, small bar magnets 85 are arranged circumaxially of the float tube in a first array. Four such magnets may be provided at equal angular positions. Their north poles may face downward. Beneath and adjacent them is a second array of four more small magnets 87 of equal size with their north poles facing upward. As shown by the flux lines in FIG. 7, this arrangement creates oppositely directed force fields within the guide tube for sweeping the reed switches, and with reed switches of the kind and arrangement of FIG. 2, will result in the same action as described in connection with FIG. 2. By making the magnets 87 of the lower array smaller, such as half the size of magnets 85, a less intense downwardly directed field is created and when associated with self-latching reed switches as shown in the FIG. 4 embodiment, will function to operate such switches similar to the FIG. 4 arrangement.

In FIG. 8 a still further modification of the invention is disclosed. In this modification the construction is similar to that of FIGS. 1 and 2 except as mentioned. The float 34' has a float tube 78' formed of magnetic material having the capability of little or no residual magnetism. This magnetic float tube acts as a field conductor for the magnetic field created by each of the bias magnets 88. The action is such that as the float rises it causes the reed switch contacts to open as the lower trailing edge of the float passes the switch. This occurs when the float is rising because when the lower edge of tube 78' just clears the vertical mid-point of the reeds, the tube at that time effectively reduces the magnetic flux through the lower reed such that the magnetic attraction between the reeds cannot overcome their physical tendency to open and accordingly they open. On the other hand as the float descends, though the bias magnet is not of sufficient strength without the presence of the magnetic tube 78' to close the contacts, the conductive magnetic effect of the tube 78' so reinforces the magnetic flux across the contacts that they close. While inverting the bias magnets so that their poles point in the opposite direction will not alter the mode of operation, i.e. make the switch normally closed rather than normally open, removing the bias magnet to the opposite end of the reed switch will effect a reversal in mode of operation, namely, to alter the switch from, for example, a normally opened to a normally closed switch.

In FIGS. 9 and 10 we have shown a reed switch subassembly and arrangement for suspending it in the guide tube. We have found that the reed switches may be conveniently supported in the guide tube by the conductive wires themselves. A common lead or conductor 200, which may be bare of insulation, extends down through the guide tube past each switch as shown in FIG. 1. Each reed switch, such as reed switch 68 in FIG. 9 has its bias magnet 88 attached to the upper terminal 93 of the switch. An electric conductor in the form of a spring connector 202 is connected to the terminal 93 by a splice 204. The connector 202 is formed of an uninsulated spring wire and its upper end is curled into a pair of loops 206 and 208 which are adapted to be resistingly separated and sprung over to grip opposite sides of the conductor 200, and as the wire 202 is bare, the loops will make an electric contact with conductor 200 as well as serving to suspend the reed switch from the conductor 200.

The lower end of the reed switch has a terminal 210 and a splice 212 serves to connect the terminal to an insulated conductor wire 214 which extends upwardly alongside the reed switch and through the loops 206 and 208 where by a butt splice 216 it is connected to a lead wire 218. The reed switch, bias magnet and splices 204 and 212 are received within a protective and insulating sleeve of non-electrically conductive, non-magnetic material 220, which is filled with a potting resin such as epoxy resin. Thus a sub-assembly is constructed which may be connected to the conductor 200 at any convenient location thereby facilitating assembly of the sensors. It is apparent that vertical adjustments between the reed switches may be readily affected by simply sliding the gripping loops 206 and 208 up and down the conductive wire 200. By having the lead wire 212 pass through the spring connector loops the switch sub-assembly is secured to the conductor 200 so that is will not be unintentionally removed nor can it be shaken or vibrated therefrom, the same acting as a lock.

The conductor 200 is brought out of the upper end of the guide tube 32 and at that point may be simply folded over such end as at 222 thereby to retain the string of reed switches and conductors at any desired level. If desired the conductor 200 may be provided with suitable markings indicating the depth of the reed switches below the upper end of the guide tube. Switch level, and consequently level sensing adjustments, may be made merely by removing the string of switch assemblies from the guide tube and resetting the levels of each switch.

We have found that the bias magnets 86, 88 and 90 of FIGS. 1 and 2 and corresponding bias magnets of other embodiments, may be turned up to 90° so that their axes extend radially with respect to the reed switch terminal, and the sensor will work satisfactorily. In this case the mode of switch operation will be similar to that previously described provided the radially inwardly facing pole of the bias magnet corresponds to the downwardly facing pole. For example, in the case of FIG. 2, if the bias magnet is arranged so that its north pole faces radially inwardly rather than facing downwardly, the switch will function just as previously described, and the same is true of the other embodiments utilizing the bias magnets.

What is claimed is:

1. A liquid level sensor comprising, in combination:
    a guide tube for vertical positioning in the liquid whose level is to be sensed;
    a float externally surrounding the guide tube for longitudinal movement thereon to rise and fall with the liquid level and having a portion of magnetic material of low residual magnetism encircling the guide tube;
    a reed switch in the guide tube having reeds of low residual magnetism extending substantially parallel to the axis of the guide tube;
    a bias magnet in the guide tube adjacent one end of the reed switch with the magnet poles facing in opposite directions longitudinally of the guide tube; and
    said portion of magnetic material on the float functioning as a field conductor for the magnetic field of the bias magnet causing the switch reeds to open and remain open as the float passes by them moving in one direction, and close and remain closed as the float passes them moving in the opposite direction.

2. The invention defined by claim 1 wherein there are a plurality of said reed switches each disposed as aforesaid and arranged in vertically spaced apart relation, and there is a bias magnet for each reed switch disposed as aforesaid.

3. The invention defined by claim 2 wherein the bias magnets are disposed adjacent the upper end of each reed switch.

4. The invention defined by claim 2 wherein the bias magnets are disposed adjacent the lower end of each reed switch.

5. The invention defined by claim 2 wherein at least one bias magnet is disposed adjacent the upper end of one reed switch and another bias magnet is disposed adjacent the lower end of another reed switch.

6. The invention defined by claim 1 wherein said portion of magnetic material comprises a sleeve secured to the float and closely encircles the guide tube.

7. The invention defined by claim 6 wherein said sleeve is adapted to engage the guide tube and serve as a bearing surface during movement of the float on the tube.

* * * * *